United States Patent
Zhang

(10) Patent No.: US 11,448,145 B2
(45) Date of Patent: Sep. 20, 2022

(54) METHOD AND DEVICE FOR INJECTING A GASEOUS FUEL

(71) Applicant: VITESCO TECHNOLOGIES GMBH, Regensburg (DE)

(72) Inventor: Hong Zhang, Tegernheim (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 15/940,071

(22) Filed: Mar. 29, 2018

(65) Prior Publication Data

US 2018/0223754 A1 Aug. 9, 2018

Related U.S. Application Data

(63) Continuation of application No. PCT/EP2016/071905, filed on Sep. 15, 2016.

(30) Foreign Application Priority Data

Sep. 30, 2015 (DE) .................... 10 2015 218 835.3

(51) Int. Cl.
*F02D 41/00* (2006.01)
*F02D 41/40* (2006.01)
(Continued)

(52) U.S. Cl.
CPC ....... *F02D 41/0085* (2013.01); *F02D 19/024* (2013.01); *F02D 41/0002* (2013.01);
(Continued)

(58) Field of Classification Search
CPC ............... F02D 41/0085; F02D 19/024; F02D 41/0002; F02D 41/0027; F02D 41/401;
(Continued)

(56) References Cited

U.S. PATENT DOCUMENTS 4,691,288 A * 9/1987 Kay .................... G01M 15/046
73/114.25
5,097,809 A * 3/1992 Sekozawa ............. F02P 5/1455
123/492

(Continued)

FOREIGN PATENT DOCUMENTS

CA 2799952 A1 3/2013
CN 101680415 A 3/2010

(Continued)

OTHER PUBLICATIONS

International Search Report and Written Opinion dated Feb. 7, 2017 from corresponding International Patent Application No. PCT/EP2016/071905.

(Continued)

*Primary Examiner* — Logan M Kraft
*Assistant Examiner* — John D Bailey

(57) ABSTRACT

A method is disclosed for injecting a gaseous fuel in an internal combustion engine having a combustion chamber and an inlet valve assigned to the combustion chamber. The method includes determining a torque output of the combustion chamber, specifying a comparative value for the torque output, and determining a difference between the torque output and the comparative value. When the difference is less than a given threshold value, the method reduces a first injection quantity of the gaseous fuel depending on the determined difference, which is injected temporally before the inlet valve is closed. When the difference is greater than the given threshold value, the method increases the first injection quantity of the gaseous fuel depending on the determined difference. Also described is a device which may carry out the method.

13 Claims, 2 Drawing Sheets

(51) Int. Cl.
*F02M 21/02* (2006.01)
*F02D 19/02* (2006.01)
*F02B 23/10* (2006.01)
*F02D 41/38* (2006.01)
*F02B 43/02* (2006.01)

(52) U.S. Cl.
CPC ....... *F02D 41/0027* (2013.01); *F02D 41/401* (2013.01); *F02D 41/402* (2013.01); *F02M 21/0275* (2013.01); *F02B 23/104* (2013.01); *F02B 43/02* (2013.01); *F02D 2041/389* (2013.01); *F02D 2200/04* (2013.01); *F02D 2200/1002* (2013.01); *F02D 2200/1004* (2013.01); *Y02T 10/30* (2013.01); *Y02T 10/40* (2013.01)

(58) Field of Classification Search
CPC ............. F02D 41/402; F02D 2041/389; F02D 2200/04; F02D 2200/1002; F02D 2200/1004; F02D 41/405; F02D 41/403; F02D 41/40; F02M 21/0275; F02B 23/104; F02B 43/02; Y02T 10/32; Y02T 10/42; Y02T 10/44
USPC .................................. 123/299; 701/103, 104
See application file for complete search history.

(56) References Cited

U.S. PATENT DOCUMENTS

| | | | | |
|---|---|---|---|---|
| 5,666,916 A | * | 9/1997 | Fujieda | F01L 13/0036 123/295 |
| 5,916,293 A | * | 6/1999 | Katakura | F16H 61/143 701/67 |
| 6,032,648 A | * | 3/2000 | Mayer | G01M 15/11 123/406.27 |
| 6,467,453 B1 | * | 10/2002 | Ernst | F02M 45/02 123/299 |
| 6,813,880 B2 | * | 11/2004 | Nishiyama | F02D 41/1462 60/285 |
| 7,117,830 B1 | * | 10/2006 | Boyer | F02D 19/022 123/295 |
| 8,573,184 B2 | * | 11/2013 | Nakagawa | F02D 41/1498 123/436 |
| 9,027,538 B2 | * | 5/2015 | Lepley | F02D 41/0025 123/577 |
| 9,267,430 B2 | * | 2/2016 | McNulty | F02D 41/005 |
| 2001/0041644 A1 | * | 11/2001 | Yasuoka | F16H 61/66 477/111 |
| 2002/0121266 A1 | * | 9/2002 | Nogi | F02M 26/01 123/361 |
| 2002/0121268 A1 | * | 9/2002 | Graf | F02D 41/1454 123/90.11 |
| 2002/0179048 A1 | * | 12/2002 | Okamoto | F02D 41/123 123/481 |
| 2004/0065279 A1 | * | 4/2004 | Hitomi | F02D 41/1475 123/58.8 |
| 2004/0134464 A1 | * | 7/2004 | Mogi | F02D 15/04 123/480 |
| 2004/0168655 A1 | * | 9/2004 | Hitomi | F02D 13/0257 123/58.8 |
| 2004/0261400 A1 | * | 12/2004 | Hiraku | F02D 41/008 60/285 |
| 2005/0022506 A1 | * | 2/2005 | Nishizawa | F02P 17/12 60/276 |
| 2005/0193721 A1 | * | 9/2005 | Surnilla | F01N 13/009 60/285 |
| 2005/0193988 A1 | * | 9/2005 | Bidner | F02M 26/43 123/481 |
| 2005/0197759 A1 | * | 9/2005 | Surnilla | F02P 5/1504 701/103 |
| 2006/0142924 A1 | * | 6/2006 | Nakagawa | F02D 41/1497 701/115 |
| 2008/0147299 A1 | * | 6/2008 | Haraguchi | F02D 41/1497 701/103 |
| 2008/0288159 A1 | * | 11/2008 | Eser | F01L 1/34 701/104 |
| 2008/0300770 A1 | * | 12/2008 | Kojima | F02D 41/027 701/103 |
| 2009/0292440 A1 | * | 11/2009 | Ichihara | F02D 41/1498 123/90.15 |
| 2010/0011762 A1 | * | 1/2010 | Hokuto | F01N 13/107 60/299 |
| 2010/0318277 A1 | * | 12/2010 | Pursifull | F02D 23/02 701/103 |
| 2011/0017173 A1 | * | 1/2011 | Portin | F02D 41/0027 701/104 |
| 2011/0061629 A1 | * | 3/2011 | Goes | F02D 41/22 123/563 |
| 2011/0100327 A1 | * | 5/2011 | Nakagawa | F02D 41/1498 123/445 |
| 2011/0185798 A1 | * | 8/2011 | Kim | F02D 41/22 73/114.49 |
| 2011/0224888 A1 | * | 9/2011 | Girotto | F02D 41/221 701/103 |
| 2012/0000197 A1 | * | 1/2012 | Maruyama | F02D 41/405 60/605.2 |
| 2012/0216776 A1 | * | 8/2012 | Nagatsu | F02D 13/0242 123/305 |
| 2013/0297187 A1 | * | 11/2013 | Doering | B60W 10/02 701/104 |
| 2013/0327037 A1 | * | 12/2013 | Fukui | F02D 41/2441 60/600 |
| 2014/0052362 A1 | * | 2/2014 | Barth | F02D 41/008 701/104 |
| 2014/0214307 A1 | * | 7/2014 | Thompson | F02D 41/2467 701/105 |
| 2014/0216396 A1 | * | 8/2014 | Yamashita | F02D 41/401 123/297 |
| 2015/0020769 A1 | * | 1/2015 | Huang | F02B 23/0669 123/145 R |
| 2015/0075487 A1 | * | 3/2015 | Glugla | F02D 41/0007 123/299 |
| 2015/0075492 A1 | * | 3/2015 | Glugla | F02P 5/1527 123/349 |
| 2015/0322877 A1 | * | 11/2015 | Eser | F02D 35/023 73/114.16 |
| 2016/0069759 A1 | * | 3/2016 | Shimada | G01M 15/042 73/114.15 |
| 2016/0115892 A1 | * | 4/2016 | Tanaka | F02P 9/002 123/406.46 |
| 2016/0123250 A1 | * | 5/2016 | Matsumoto | F02D 41/045 123/406.46 |
| 2016/0123253 A1 | * | 5/2016 | Saito | F02D 37/02 123/406.23 |
| 2016/0252041 A1 | * | 9/2016 | Harada | F02B 23/101 123/299 |
| 2016/0305356 A1 | * | 10/2016 | Iwata | F02D 41/26 |
| 2017/0107922 A1 | * | 4/2017 | Nakasaka | F02D 37/02 |
| 2017/0241359 A1 | * | 8/2017 | Hosoya | F02D 41/0255 |
| 2017/0284282 A1 | * | 10/2017 | Ochi | F02D 41/40 |

FOREIGN PATENT DOCUMENTS

| | | |
|---|---|---|
| CN | 103590917 A | 2/2014 |
| CN | 103726899 A | 4/2014 |
| CN | 103975152 A | 8/2014 |
| CN | 104454183 A | 3/2015 |
| CN | 104603433 A | 5/2015 |
| CN | 104632433 A | 5/2015 |
| CN | 104995392 A | 10/2015 |
| DE | 10341089 A1 | 4/2005 |
| DE | 102012210301 B3 | 9/2013 |
| JP | 2006138293 A | 6/2006 |
| JP | 2006183653 A | 7/2006 |
| JP | 2010084746 A | 4/2010 |

(56) References Cited

FOREIGN PATENT DOCUMENTS

| JP | 2014020202 A | 2/2014 |
|----|--------------|--------|
| KR | 20110036229 A | 4/2011 |

OTHER PUBLICATIONS

German Office Action dated Apr. 7, 2016 for corresponding German Patent Application No. 10 2015 218 835.3.
Korean Notice of Allowance dated Jun. 26, 2019 for corresponding Korean Application No. 10-2018-7009167.
Chinese First Office Action dated May 20, 2020 for the corresponding Chinese Patent Application No. 201680057307.2.
Chinese Notice of Allowance dated Jan. 13, 2021, for corresponding Chinese Patent Application No. 201680057307.2.

\* cited by examiner

METHOD AND DEVICE FOR INJECTING A GASEOUS FUEL

CROSS REFERENCE TO RELATED APPLICATIONS

This application is a continuation of International application No. PCT/EP2016/071905, filed Sep. 15, 2016, which claims priority to German application No. 10 2015 218 835.3, filed on Sep. 30, 2015, each of which is hereby incorporated by reference herein in its entirety.

FIELD OF INVENTION

The invention relates to a method for injecting a gaseous fuel for an internal combustion engine. In particular, it is possible to realize torque equalization of the torque output of combustion chambers of the internal combustion engine with the method. The invention also relates to a device which is configured to carry out such a method.

BACKGROUND

In internal combustion engines, the masses of fuel which are injected into the individual combustion chambers of the internal combustion engine can vary on account of manufacturing tolerances and as a result of the occurrence of aging. Differences in the masses of the fuel injected result in torque differences between the individual combustion chambers. For example, it is possible to estimate the torque output by means of a pressure sensor which measures the pressure in the combustion chamber.

SUMMARY

It is desirable to specify a method and a corresponding device which allow reliable injection of a gaseous fuel such that a desired torque output is realized.

The invention is distinguished by a method for injecting a gaseous fuel and by a device which is configured to carry out the method.

According to embodiments of the invention, an internal combustion engine has a combustion chamber. The combustion chamber is assigned an inlet valve. The inlet valve serves in particular to control the quantity of air which is let into the combustion chamber. A torque output of the combustion chamber is determined. A comparative value for the torque output is specified. A difference between the torque output and the comparative value is determined. When the difference is less than a given threshold value, the first injection quantity of the gaseous fuel is reduced depending on the determined difference. The first injection quantity is the injection quantity which is injected temporally before the inlet valve is closed. When the difference is greater than the given threshold value, the first injection quantity of the gaseous fuel is increased depending on the determined difference.

The first injection quantity of the gaseous fuel is injected into the combustion chamber before the inlet valve is closed. A second injection quantity of the gaseous fuel is injected temporally after the inlet valve is closed. The first injection quantity and the second injection quantity may each be zero, and accordingly no fuel is then injected before or after the inlet valve is closed, respectively.

Since a gaseous fuel is used, a change in the first injection quantity has an effect on the associated air quantity flowing into the combustion chamber. The gaseous fuel takes up a particular volume in the combustion chamber with the inlet valve open. Accordingly, less air passes into the combustion chamber. As a result of a change in the first injection quantity, which, with the injection valve open, is injected temporally before the inlet valve is closed, the associated air quantity which passes into the combustion chamber is thus changed. As a result, it is possible to change the torque output of the combustion chamber and adapt it in particular to the comparative value for the torque output.

According to further embodiments, when the difference is less than the given threshold value, an auxiliary air mass for the combustion chamber is determined depending on the determined difference. Depending on the auxiliary air quantity, the first injection quantity of the gaseous fuel is reduced. A reduction in the gaseous fuel which is injected before the inlet valve is closed results in an increase in the air mass which may pass into the combustion chamber. When the difference is less than the given threshold value, i.e., the combustion chamber has a lower torque output than the comparative value, less gaseous fuel is injected before the inlet valve is closed, and therefore a greater air mass passes into the combustion chamber before the inlet valve is closed.

According to further embodiments, a second injection quantity is increased, which is injected temporally after the inlet valve is closed, when the difference is less than the given threshold value. Therefore, it is possible to control the ratio of the air quantity to the quantity of fuel such that $\lambda$ remains at 1. When the difference is less than the given threshold value, according to embodiments, the first injection quantity of the gaseous fuel is reduced and the second injection quantity of the gaseous fuel is increased. Therefore, it is possible to allow an auxiliary air mass for the combustion chamber and in the process to realize $\lambda$ equal to 1. Therefore, the torque output of the combustion chamber is increased and adapted for example to the comparative value.

For example, when the difference is less than the given threshold value, a start of the injection of the gaseous fuel is shifted in the direction of a time at which the inlet valve is closed. In the case of single injection, the injection time extends beyond the time at which the inlet valve is closed. The first injection quantity is injected before the inlet valve is closed and the second injection quantity is injected continuously following the first injection quantity. As a result of the start of injection being shifted in the direction of the time at which the inlet valve is closed, the first injection quantity is reduced and the second injection quantity increased. The end of injection is likewise shifted back away from the time at which the inlet valve is closed.

Alternatively, multiple injection is also possible. In this case, first injection of the first injection quantity takes place before the inlet valve is closed, and, spaced apart therefrom, second injection for injecting the second injection quantity takes place after the inlet valve has been closed.

Regardless of single or multiple injection, according to embodiments, a reduction of the air mass is determined depending on the determined difference, when the difference is greater than the given threshold value. The first injection quantity of the gaseous fuel is increased depending on the determined reduction. In particular, in this case, the second injection quantity of the gaseous fuel is reduced depending on the determined difference. Therefore, it is possible to reduce the torque output of the combustion chamber and in the process to maintain $\lambda$ equal to 1.

For example, the start of injection of the gaseous fuel is shifted in the direction away from the time at which the inlet valve is closed, when the difference is greater than the given threshold value. As a result, the proportion of fuel which is injected before the inlet valve is closed is increased. Since the gaseous fuel displaces air out of the combustion chamber, the air quantity which passes into the combustion chamber before the inlet valve is closed is thus reduced. Both the fuel and the air are gaseous. With the inlet valve open, the volume which is available for air is thus reduced when more fuel is injected. This is because the volume taken up by the fuel in the combustion chamber is then increased. The volume which the air takes up in the combustion chamber is correspondingly reduced. When the injection quantity of fuel is reduced, the air quantity increases correspondingly, when the inlet valve is open.

According to embodiments, the internal combustion engine has a plurality of combustion chambers. The specifying of the comparative value for the torque output includes determining a particular torque output of the combustion chambers. A mean of the torque outputs of the combustion chambers is determined. The determined mean is used as comparative value. In particular, the comparative value is determined during constant operation, when a torque demand at the internal combustion engine is approximately constant. For example, the torque output of the combustion chambers is estimated by means of measured tooth times via a crankshaft sensor.

BRIEF DESCRIPTION OF THE DRAWINGS

Further advantages, features and developments may be gathered from the following examples which are explained in conjunction with the figures.

In the figures.

DETAILED DESCRIPTION

Figure 1:
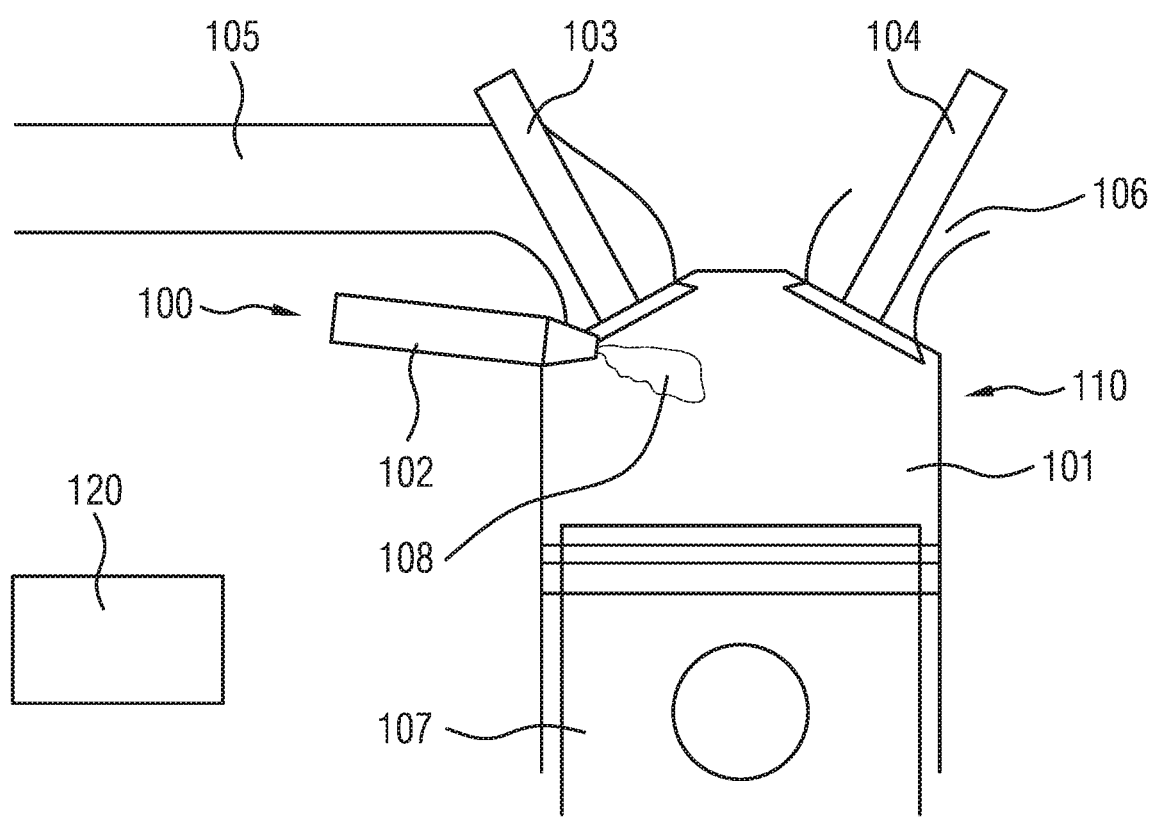
FIG. 1 shows a schematic illustration of one embodiment of an injection system according to one embodiment.

FIG. 1 shows a schematic illustration of an injection system 100 according to one embodiment. The injection system 100 serves to inject a gaseous fuel 108 into a combustion chamber 101 of an internal combustion engine 110. One combustion chamber 101 is illustrated in FIG. 1, but usually the internal combustion engine 110 has a plurality of combustion chambers 101. These are configured in a manner corresponding to the combustion chamber 101 illustrated in FIG. 1.

An intake pipe 105 is coupled to the combustion chamber 101 in order to feed air into the combustion chamber 101. An exhaust pipe 106 is coupled to the combustion chamber 101 in order to discharge exhaust gases. Arranged on the intake pipe 105 is an inlet valve 103. The inlet valve 103 serves to control the quantity, or mass, of air which passes into the combustion chamber 101 through the intake pipe 105. With the inlet valve 103 open, air may pass from the intake pipe 105 into the combustion chamber 101. With the inlet valve 103 closed, a flow of air from the intake pipe 105 into the combustion chamber 101 is prevented as far as possible. An outlet valve 104 is arranged on the exhaust pipe 106 in order to control letting out of the exhaust gas.

An injection valve 102 is arranged in order to inject the gaseous fuel 108 into the combustion chamber 101. In particular, it is possible to use the injection valve 102 to inject the quantity of fuel 108 which is specified by a device 120. The device 120 is for example part of an engine controller of the internal combustion engine 110. The device 120 is also coupled to the inlet valve 103. For example, the device 120 controls the opening and closing of the inlet valve 103. According to further embodiments, the opening and closing of the inlet valve 103 are controlled in a further device (not explicitly illustrated). The device 120 is then informed of the time at which the inlet valve 103 is closed.

A piston 107 is arranged in the combustion chamber 101. The piston 107 is movable in the combustion chamber 101. During a downward movement of the piston 107, air is drawn into the combustion chamber 101 of the cylinder via an intake tract having the intake pipe 105. In a working stroke of the internal combustion engine 110, a mixture of air and fuel 108 in the combustion chamber 101 is ignited. As a result of the explosion, the piston 107 is driven down again. In the process, a torque is transmitted to a driveshaft (not illustrated) of the internal combustion engine 110. On account of production tolerances and aging effects, the output torque may vary between the individual combustion chambers 101 of the internal combustion engine 110.

Figure 2:
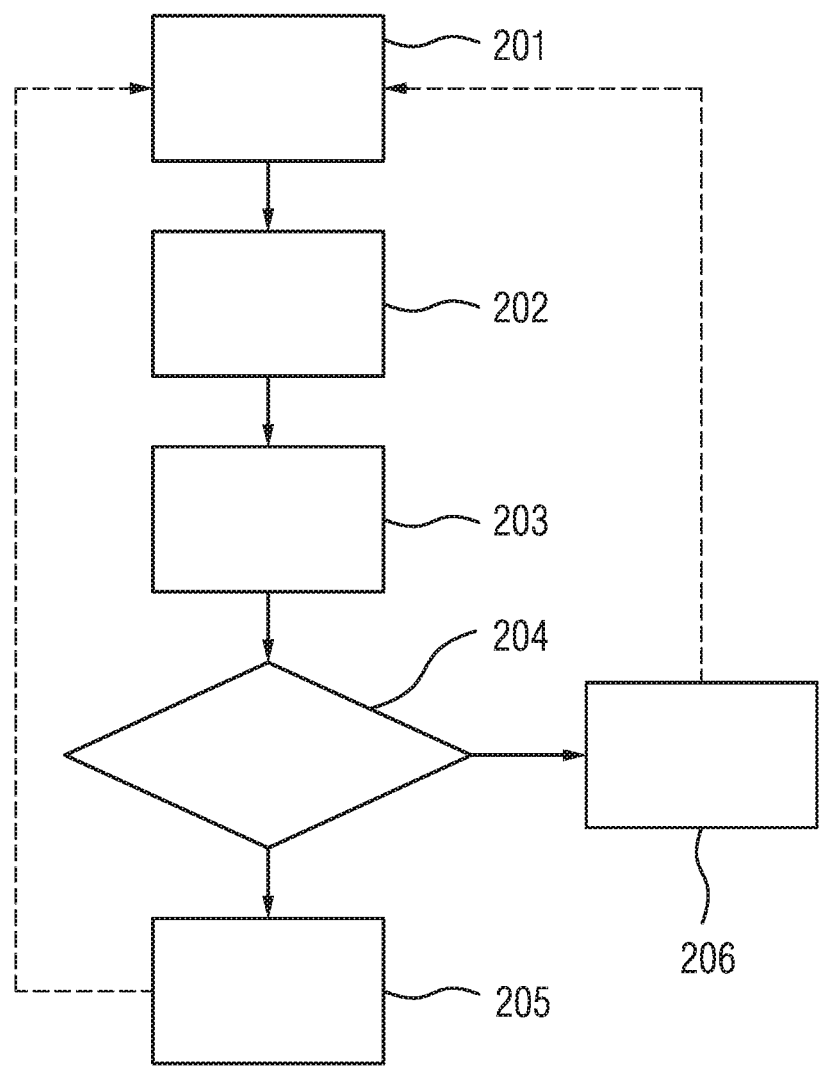
FIG. 2 shows a flow diagram of one embodiment of a method for injecting a gaseous fuel.

In conjunction with FIG. 2, a method for equalizing the torque differences during gas direct injection is described.

In step 201, a torque TQ_ist_cyl_x is determined for each combustion chamber 101 during the combustion phase. For example, the torque is estimated in each case via tooth times which are determined by means of a crankshaft sensor. Such a method is described for example in DE 10 2012 210 301 B3. Other methods for determining the torque output of each of the combustion chambers 101 are possible.

In a step 202 a mean TQ_mid is formed from the determined torques of all the combustion chambers 101. To this end, the sum of the torques TQ_ist_cyl_x is formed and divided by the number of combustion chambers 101.

In a step 203 a difference D_TQ_x between the torque output TQ_ist_cyl_x of each combustion chamber 101 and the mean TQ_mid is formed, D_TQ_x=TQ_ist_cyl_x-TQ_mid.

In a step 204, the determined difference DT_Q is compared with a comparative value. Optionally, it is determined beforehand whether the difference D_TQ_x is greater than a given tolerance, for example whether the difference D_TQ_x deviates from TQ_mid by more than 3%. If the deviation DT_TQ_x is greater than the tolerance, the torque equalization is subsequently carried out by variation of the injection strategy.

To this end, it is determined in step 204 whether the difference D_TQ_x is less or greater than zero. If the difference D_TQ_x is less than zero, the method is continued in step 205.

If the difference D_TQ_x is greater than zero, the method is continued in step 206. If the difference D_TQ_x is less than zero, this means that the torque output TQ_ist_cyl_x of the combustion chamber 101 is less than the torque mean TQ_mid. Thus, in step 205, an auxiliary air mass is calculated depending on the determined difference D_TQ_x. Depending on this determined required auxiliary air mass for the combustion chamber 101, the start of injection of the gaseous fuel 108 is shifted temporally back. Thus, during the intake stroke, while the inlet valve 103 is open, less gaseous fuel 108 is injected into the combustion chamber 101 and thus the air mass is increased.

It is also possible for the start of injection to be shifted to a time after the inlet valve 103 has been closed. Thus, the gaseous fuel 108 does not displace any air from the combustion chamber 101 during the intake stroke. The injected gaseous fuel 108 does not change the air mass in the combustion chamber 101.

A first injection quantity of the gaseous fuel 108, which is injected before the inlet valve 103 is closed, is thus reduced. The reduction relates in particular to the quantity which was injected when the torque TQ_ist_cyl_x was determined in step 201.

A second injection quantity, which is injected after the inlet valve 103 is closed, is increased. Since the air quantity is increased, the total injected fuel quantity made up of the first injection quantity and second injection quantity is increased, in order that λ remains at 1.

Subsequently, the method is continued for example at step 201 again and the values TQ_ist_cyl_x, TQ_mid and D_TQ_x determined again. The start of injection of the fuel 103, or the quantity of the first injection quantity and the quantity of the second injection quantity, is shifted until the value of D_TQ_x for the combustion chamber 101 is within tolerance again or until the start of injection lies after the inlet valve 103 has been closed.

In the case of multiple injection, first injection for injecting the first fuel quantity takes place in the intake stroke. Second injection, spaced apart temporally therefrom, for injecting the second fuel quantity takes place after the inlet valve 103 has been closed. The required auxiliary air mass is realized by the reduction in the first injection quantity before the inlet valve 103 is closed. A reduction in the first injection quantity is possible until this quantity is equal to zero. The second injection is accordingly increased. The second injection is increased by the reduction in quantity of the first injection, and additionally increased by the fuel quantity which is necessary as a result of the auxiliary air mass in the combustion chamber 101, in order that λ remains equal to 1. The second injection quantity of the second injection is increased and the first injection quantity accordingly reduced until either the determined difference D_TQ_x is within tolerance again or the entire injection quantity is realized by the second injection and an injection quantity of zero is specified in the case of the first injection.

If the difference D_TQ_x is greater than zero, this means that the associated combustion chamber 101 has a torque output greater than the mean TQ_mid. In step 206, the start of the injection of fuel 108 is then shifted in the earlier direction before the inlet valve 103 is closed. Accordingly, the air which passes into the combustion chamber 101 during the intake stroke is reduced. In a manner dependent thereon, the second injection quantity is reduced, in order that λ remains equal to 1.

The start of injection is shifted temporally forward until the determined value of the difference D_TQ_x is within tolerance again, or the end of the injection of the fuel 108 lies before the time at which the inlet valve 103 is closed.

In the case of multiple injection, the first injection takes place in the intake stroke and the second injection takes place after the inlet valve 103 has been closed. The first injection quantity is increased, depending on the difference D_TQ_x, and the second injection quantity accordingly reduced until either the determined valve of D_TQ_x is within tolerance again, or the entire quantity of fuel 108 is already realized by the first injection quantity of the first injection and the second injection quantity is equal to zero.

With the described exemplary embodiments of the injection system 100 and of the method, it is possible to realize cylinder-individual torque equalization by means of an injection strategy in gas direction injection, for instance with compressed natural gas (CNG). In conjunction with gaseous fuel, the expression metering the fuel into the combustion chamber 101 is also used. As a result, driving comfort is increased without there being any drawbacks for the consumption of the fuel 108. Torque equalization with gas direct injection may thus be realized easily.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

LIST OF REFERENCE SIGNS

100 Injection system
101 Combustion chamber
102 Injection valve
103 Inlet valve
104 Outlet valve
105 Intake pipe
106 Exhaust pipe
107 Piston
108 Fuel
110 Internal combustion engine
120 Device
TQ_ist_cyl_x Torque output
TQ_mid Comparative value
D_TQ_x Difference
201-206 Method steps

The invention claimed is:

1. A method for injecting a gaseous fuel for an internal combustion engine having a combustion chamber and an inlet valve assigned to the combustion chamber, the method comprising:
   determining a torque output of the combustion chamber,
   specifying a comparative value for the torque output,
   determining a difference between the torque output and the comparative value,
   providing an injection of the gaseous fuel in the combustion chamber,
   when the difference is less than a given threshold value:
      delaying a start time of the injection of the gaseous fuel,
      reducing a first injection quantity of the injection of the gaseous fuel depending on the determined difference, which is injected temporally before the inlet valve is closed, and
      increasing a second injection quantity of the injection of the gaseous fuel, which is injected temporally after the inlet valve is closed, depending on the determined difference,
   when the difference is greater than the given threshold value:
      advancing the start time of the injection of the gaseous fuel,
      increasing the first injection quantity of the injection of the gaseous fuel depending on the determined difference, and
      reducing the second injection quantity of the injection of the gaseous fuel, depending on the determined difference,
   wherein the internal combustion engine has a plurality of combustion chambers, and the determining of the torque output and the specifying of the comparative value for the torque output comprises:
      determining a particular torque output of the combustion chambers,
      determining a mean of the torque outputs of the combustion chambers, and using the mean as the comparative value,
wherein the first injection quantity and the second injection quantity are injected continuously one after the other.

2. The method as claimed in claim 1, further comprising:
when the difference is less than the given threshold value:
determining an auxiliary air mass for the combustion chamber depending on the determined difference,
wherein reducing the first injection quantity of the gaseous fuel is dependent on the determined auxiliary air mass.

3. The method as claimed in claim 1, further comprising:
when the difference is greater than the given threshold value:
determining a reduction in the air mass depending on the determined difference,
wherein increasing the first injection quantity of the gaseous fuel is dependent on the determined reduction in the air mass.

4. The method as claimed in claim 1, further comprising:
when the difference is less than the given threshold value, shifting a start of injection of the gaseous fuel in a direction of a time at which the inlet valve is closed.

5. The method as claimed in claim 4, further comprising:
when the difference is greater than the given threshold value, shifting the start of injection of the gaseous fuel in the direction away from the time at which the inlet valve is closed so that the start of injection occurs earlier in time than the start of injection without the shifting.

6. The method of claim 1, further comprising, prior to reducing the first injection quantity and increasing the first injection quantity, comparing the difference to the given threshold value, wherein reducing the first injection quantity and increasing the first injection quantity are based upon the comparison.

7. An engine controller for controlling a gaseous fuel for an internal combustion engine having a combustion chamber and an inlet valve assigned to the combustion chamber, the engine controller configured to:
determine a torque output of the combustion chamber,
specify a comparative value for the torque output,
determine a difference between the torque output and the comparative value,
provide an injection of the gaseous fuel in the combustion chamber,
when the difference is less than a given threshold value:
delay a start time of the injection of the gaseous fuel,
reduce a first injection quantity of the injection of the gaseous fuel depending on the determined difference, and inject the first injection quantity temporally before the inlet valve is closed, and
increase a second injection quantity of the injection of the gaseous fuel, which is injected temporally after the inlet valve is closed, depending on the determined difference, when the difference is greater than the given threshold value:
advance the start time of the injection of the gaseous fuel,
increase the first injection quantity of the injection of the gaseous fuel depending on the determined difference, and
reduce the second injection quantity of the injection of the gaseous fuel, which is injected temporally after the inlet valve is closed, depending on the determined difference,
wherein the first injection quantity and the second injection quantity are injected continuously one after the other.

8. The engine controller of claim 7, wherein the engine controller is configured such that when the difference is less than the given threshold value, the engine controller determines an auxiliary air mass for the combustion chamber depending on the determined difference, wherein reducing the first injection quantity of the gaseous fuel is dependent on the determined auxiliary air mass.

9. The engine controller of claim 7, wherein when the difference is greater than the given threshold value, the engine controller determines a reduction in the air mass depending on the determined difference, wherein increasing the first injection quantity of the gaseous fuel is dependent on the determined reduction in the air mass.

10. The engine controller of claim 7, wherein when the difference is less than the given threshold value, the engine controller shifts a start of injection of the gaseous fuel in a direction of a time at which the inlet valve is closed.

11. The engine controller of claim 7, wherein when the difference is greater than the given threshold value, the engine controller shifts the start of injection of the gaseous fuel in the direction away from the time at which the inlet valve is closed so that the start of injection occurs earlier in time than the start of injection without the shifting.

12. The engine controller of claim 7, wherein the internal combustion engine has a plurality of combustion chambers, and the engine controller determining of the torque output and the specifying of the comparative value for the torque output comprises the engine controller
determining a particular torque output of the combustion chambers,
determining a mean of the torque outputs of the combustion chambers, and
using the mean as the comparative value.

13. The engine controller of claim 7, wherein the engine controller is further configured to, prior to reducing the first injection quantity and increasing the first injection quantity, comparing the difference to the given threshold value, wherein reducing the first injection quantity and increasing the first injection quantity are based upon the comparison.

* * * * *